UNITED STATES PATENT OFFICE.

DAVID J. MORRIS, OF SEATTLE, WASHINGTON, ASSIGNOR OF ONE-HALF TO JAMES E. CARROLL, OF SEATTLE, WASHINGTON.

CEMENTITIOUS COMPOUND.

1,096,384.  Specification of Letters Patent.  Patented May 12, 1914.

No Drawing.  Application filed March 20, 1913.  Serial No. 755,810.

*To all whom it may concern:*

Be it known that I, DAVID J. MORRIS, a citizen of the United States, and resident of the city of Seattle, in the county of King and State of Washington, have invented certain new and useful Improvements in Cementitious Compounds, of which the following is a specification.

My invention relates to a cementitious compound which is adapted to be used as a base, or cementitious agent with which to bind together various kinds of aggregates and materials to form solid masses and for forming numerous articles.

The object of my invention is the production of a compound which is of a novel character and which may be used to cement together other materials in a more perfect manner than is possible by the use of the common types of cement, and to use materials which are not now so used for the purpose of forming a cementitious compound.

My invention consists of a compound composed of the ingredients combined in the proportions and treated in the manner which will be herein described and particularly defined by the claims.

My invention is based primarily and principally upon certain facts which I have discovered relating to the behavior of a compound of magnesia when combined with other ingredients, in, so far as its cementitious action is concerned and the character and behavior of the resulting compound after mixing.

The ingredients which I include in making my compound are oxid of magnesia, calcium hydrate and a solution of chlorid of magnesia. The oxid of magnesia and the calcium hydrate should be in the form of a dry powder. The chlorid of magnesia should be a solution at the specific gravity of 21° Baumé.

It is not sufficient that the oxid of magnesia be ordinary commercial "calcined magnesia," as this invariably contains such impurities, particularly in the way of a percentage of lime, or calcium oxid, which will interfere with the proper chemical action and prevent obtaining the superior results which would follow from the use of a pure oxid of magnesia. A slight amount of calcium oxid in the magnesium oxid, will cause serious trouble or failure. While it is theoretically possible to offset the effect of the calcium contained in the magnesium oxid by a change of the calcium hydrate used, this would, practically, be impracticable. When properly made the result is a fixed chemical compound, and one in which an excess of calcium has a very deleterious effect.

The proportions of the ingredients used are as follows. Three parts of pure oxid of magnesia are combined with one part of calcium hydrate, both being in the dry form. After these have been thoroughly mixed, a sufficient quantity of the 21° Baumé solution of chlorid of magnesia is added, to give the plastic quality desired. The amount of this solution used will depend upon the conditions under which it is to be used and the results desired. In some cases a rather stiff paste may be best suited for the purpose, while in other cases a thin, runny mixture may be best.

The above ingredients, mixed in the proportions given, form a compound which may be used as a cementitious base or binder for various kinds of aggregates, after the manner in which cement is used to bind together other materials. The relative proportions of aggregates and binder will vary with the character of the aggregates and the character of product desired, the same varying through as wide a range as that employed in the use of ordinary cement. It requires approximately 24 hours to set to such an extent that it may be safely handled, but for thorough curing or setting, it requires approximately ten days. During this time the temperature of the product, to secure the most perfect results, should be maintained continuously at 70° F. I have found that during this period of time and under the conditions of temperature named, the product effloresces, bringing to the surface a coating of chlorin salts, supposed to be chlorid of calcium, which may be wiped off. If the temperature conditions are changed, this efflorescence stops and these chlorids are permanently retained in the body of the product, making the product much inferior for some purposes. Where cured under the preferred conditions the product has a bright appearance, will take a high polish, and is superior in strength and its ability to resist the action of heat, water, acids and other deteriorating agencies. If this curing action is checked by change of temperature or other influences, the product is yet a good, strong product, but its surface appearance is not so bright and it will not take as fine a polish. It is also somewhat inferior in the practical qualities of strength and ability to resist heat and other deteriorating influences.

The quality of a stone made by combining mineral masses by the use of my binder, will be affected by the character of the aggregates used. The aggregates should be inert, or such as are not chemically affected by the changes occurring in the binder. Where these are of such character that they are themselves resistant to the influences of heat, moisture, etc., the result is a stone with remarkable fire and water resisting qualities.

As commercially furnished, the product will consist of the oxid of magnesia and the calcium hydrate, combined together in a dry, powdered mass, and the chlorid of magnesia, separate therefrom, this last may be in the dry form, or as a solution of a known strength, as found to best fit the conditions under which it is to be handled and sold. These two products will be combined, under the conditions hereinbefore stated, when the product is to be used.

What I claim as my invention is:

1. A cementitious compound composed of calcium-free oxid of magnesia three parts and calcium hydrate one part.

2. A cementitious binder composed of oxid of magnesia and calcium hydrate in the proportions of three parts of the oxid of magnesia and one part of the calcium hydrate.

In testimony whereof I have hereunto affixed my signature at Seattle, Washington, this 13th day of March, 1913.

DAVID J. MORRIS.

Witnesses:
P. J. CLARKE,
F. O. KALBERG.